May 1, 1934.　　　　R. K. LEE　　　　1,957,218
MOTOR MOUNTING
Filed June 14, 1932　　　2 Sheets-Sheet 1
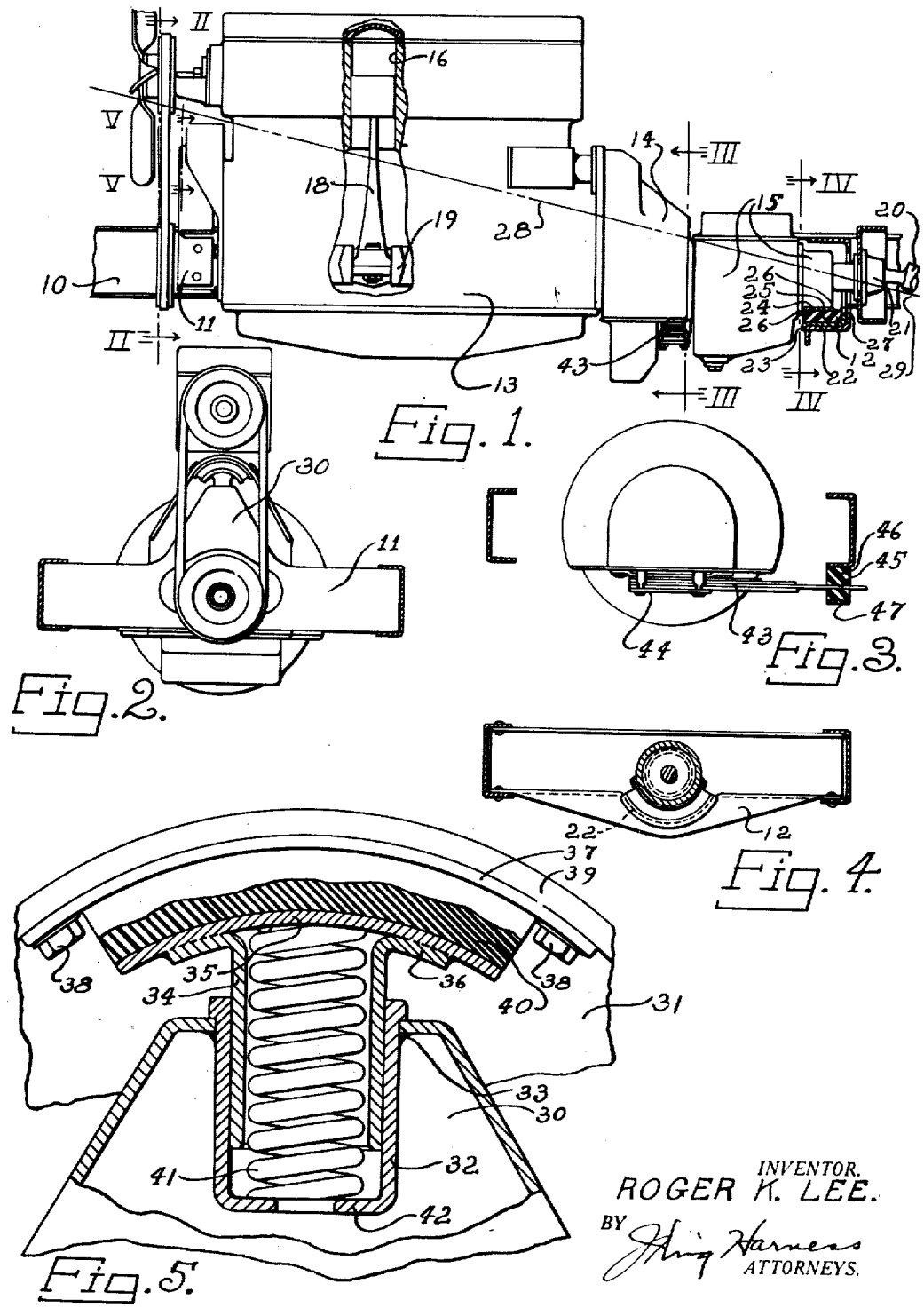

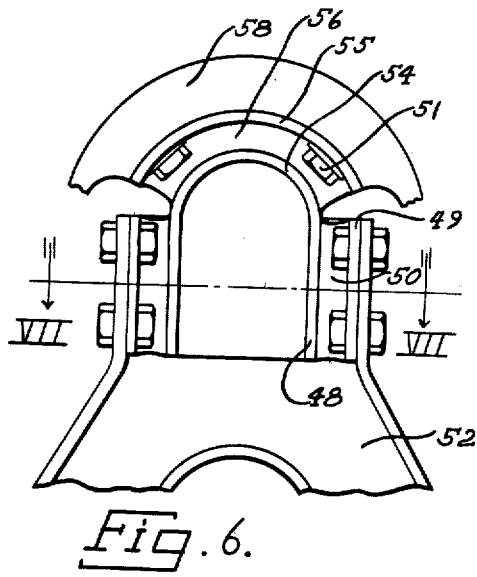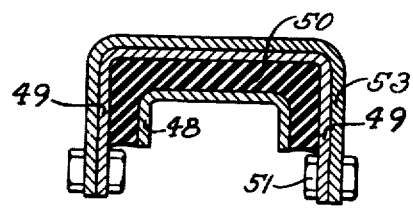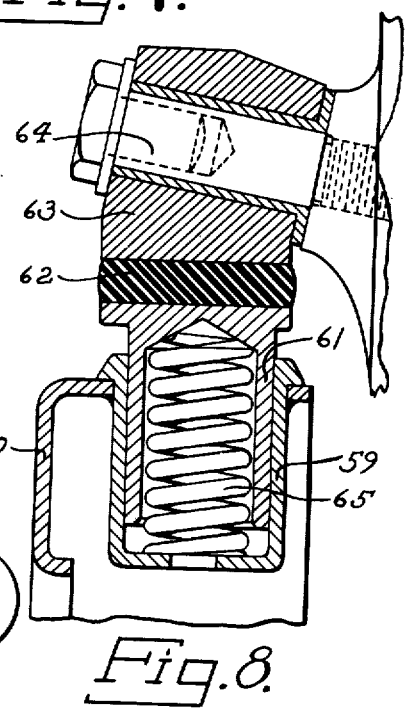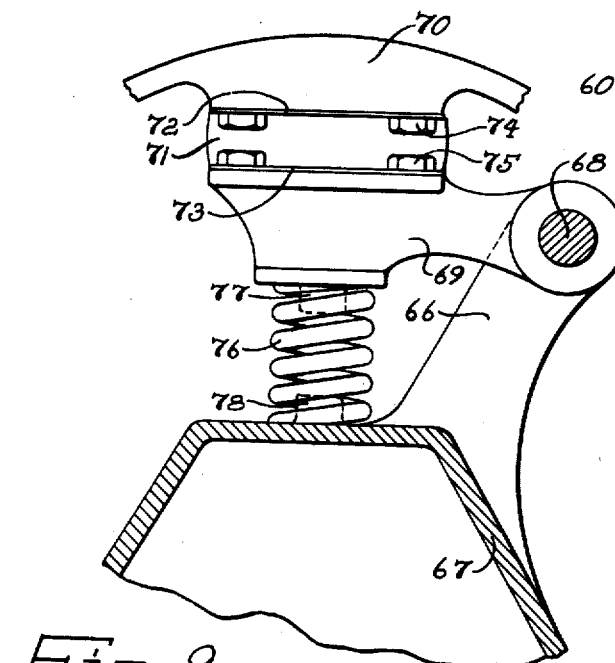

Patented May 1, 1934

1,957,218

UNITED STATES PATENT OFFICE 1,957,218

MOTOR MOUNTING

Roger K. Lee, Highland Park, Mich., assignor to Chrysler Corporation, Detroit, Mich., a corporation of Delaware Application June 14, 1932, Serial No. 617,145

23 Claims. (Cl. 248—14.2)

This invention relates to improved mountings for reciprocating piston type engines such as internal combustion engines, for use in propelling vehicles and it has particular relation to a novel form and arrangement of mounting members which permit a limited amount of movement of the engine.

More specifically, our invention provides a means of supporting an internal combustion engine so that it may oscillate in diverse directions and in a manner such that resilient opposition of a predetermined value in each direction respectively may be provided.

One of the main objects of the invention is to prevent the application of severe impact and vibration from being applied on the frame of a vehicle, or other structure in which an engine is mounted, by the forces which tend to move the engine during operation.

Another object of this invention is to provide resilient supporting means in an engine mounting which permit limited movement of the engine in diverse directions under the influence of various differently directed forces applied thereon and which are adapted to be calibrated and arranged to bring the resistance to displacement in each direction respectively to a predetermined value.

Another object of the invention is to provide means of this character for supporting an engine so that the movements thereof in diverse directions are of an oscillatory nature, each about a different axis respectively.

A further object of the invention is to provide resilient elements in supporting means of this character which bear a portion of the weight of the engine and which control oscillation of the engine about one axis without influencing its oscillatory movement about another axis.

Other objects of the invention are to provide individual resilient means for independently opposing oscillation of the engine about the respective axes and which may be individually calibrated so as to bring the natural frequency of the oscillatory movement of the engine about each respective axis to a desired value; and to provide individual resilient means of this character which are calibrated to bring the natural frequency of oscillation of the engine about the axis with respect to which the torque reaction impulses tend to oscillate it below the frequency of the torque reaction impulses at the lower end of the operating range of the engine, and to bring the natural frequency of oscillation of the engine about the axis with respect to which the internal forces, such as the secondary force impulses which are prominent in a four-cylinder engine, tend to oscillate it below the frequency of such impulses at the lower end of the operating range of the engine.

Still further objects of the invention are to provide rigid elements in a mounting member of this character which are guided so as to move relative to each other in a well defined course during oscillation of the engine in response to the unbalanced internal force impulses; to provide a spring between these rigid members for opposing such oscillation; and to provide a yieldable nonmetallic pad having sound insulating properties between one end of the spring and one of the relatively movable elements of the mounting member for preventing sound vibrations created in the engine from being transmitted directly to the frame.

Illustrative embodiments of my invention are shown in the accompanying drawings, in which:

Fig. 1 is a side view, partly in elevation and partly in section, of an internal combustion engine mounted according to my invention in a chassis frame of a vehicle.

Fig. 2 is a transverse sectional view taken on the line II—II of Fig. 1.

Fig. 3 is a transverse sectional view taken on the line III—III of Fig. 1.

Fig. 4 is a transverse sectional view taken on the line IV—IV of Fig. 1.

Fig. 5 is an enlarged fragmentary sectional view taken on the line V—V of Fig. 1 and showing an engine mounting member embodying the invention in detail.

Fig. 6 is a fragmentary elevational view of an engine mounting member which embodies a modified form of my invention.

Fig. 7 is a horizontal sectional view taken on the line VII—VII of Fig. 6.

Fig. 8 is a fragmentary sectional view of an engine mounting member showing another form of my invention.

Fig. 9 is a fragmentary view, partly in section and partly in elevation, of an engine mounting member embodying a still further development of the invention.

In the form shown in Figs. 1 to 5, inclusive, the improved internal combustion engine mounting is illustrated in conjunction with a vehicle chassis frame which includes longitudinally extending channel members 10 and rigid, transversely disposed front and rear members 11 and 12, respectively, which are fixed to the longitudinal channel members by rivets or other suitable means.

The transverse frame member 11 is located at the front end of the vehicle chassis frame and the transverse member 12 is spaced rearwardly therefrom and preferably located at the rear end of the entire engine unit which includes an engine crankcase 13, and clutch and transmission housings 14 and 15 which are rigidly fixed together in longitudinally aligned relation.

The internal combustion engine is of the reciprocating piston type and it has a plurality of longitudinally aligned cylinders 16. Slidably mounted in each cylinder is a reciprocating piston 17 to which is pivotally attached a connecting rod 18 which is journaled at its lower end on a crankshaft 19 in the usual manner. A clutch mechanism (not shown) within the housing 14 connects the crankshaft 19 with a transmission mechanism (not shown) within the housing 15 in a conventional manner and the transmission mechanism in turn drives a propeller shaft 20 through a universal or other flexible joint 21.

The rear transverse member 12 is provided at its medial portion with an arcuate shaped recess 22 in which is disposed an engine mounting member that includes spaced upper and lower substantially concentric arcuate metal brackets 23 and 24 having a rubber pad 25 therebetween. The pad 25 is preferably rigidly bonded by vulcanization to the adjacent faces of the brackets 23 and 24 which are in turn secured to the rear end of the transmission housing 15 and to the transverse frame member 12, respectively. The upper bracket 24 has outwardly turned marginal edge portions 26 embedded in the rubber pad 25 and the outer bracket 23 has an inwardly extending edge portion 27 abutting against the rear extremity of the rubber member 25. Engagement of the flanges 26 and 27 with the rubber pad limits fore and aft movement of the engine unit.

The rubber pad of the rear mounting member permits oscillation of the engine about an axis 28 extending generally in the direction of the length of the engine and it also permits oscillation of the engine about an axis 29 extending crosswise of the length of the engine, and diagrammatically illustrated in Fig. 1 as a point. The axis 29 may in some instances be substantially normal to the length of the engine unit or it may extend diagonally with respect thereto.

The front transverse member 11 of the frame structure has an upstanding intermediate portion 30, best shown in Fig. 2, on which is provided a front engine mounting member 31, shown in detail in Fig. 5. The mounting member 31 includes a stationary tubular support 32 which extends through an aperture in the upstanding portion 30 of the front transverse frame member and which is rigidly secured thereto by welding, as indicated at 33, or by other suitable means. Slidably mounted in the tubular support 32 is a hollow post 34 which is guided by the support 32 for substantially vertical linear movement. The upper end of the post 34 is provided with an arcuate shaped plate 35 which is disposed across the upper end thereof and rigidly fixed by welding, or other suitable means, to outwardly bent wall portions 36 of the post. The front engine mounting member 31 also includes an arcuate shaped metal bracket 37 which is secured by bolts 38 to a correspondingly shaped flange 39 fixed to the front end of the engine crankcase 13. Disposed between the adjacent faces of the bracket 37 and the plate 35 is a pad 40 comprising yieldable material, preferably rubber, which is integrally bonded by vulcanization to the adjacent sides of the bracket and plate. The rubber pad 40 permits the engine to oscillate relative to the frame structure about the lengthwise extending axis 28 and it also serves as sound insulation for preventing the transmission of sound vibrations from the metal structure of the engine to the metal frame structure.

The weight of the front end portion of the engine is resiliently supported by a metal coil spring 41 which is confined within the hollow cylindrical post 34' and tubular support 32 and which bears at one end against the plate 35 and at its other end against inwardly turned wall portions 42 of the tubular support. During oscillatory movement of the engine about the crosswise extending axis 29 the cylindrical post 34 is permitted to move vertically, upwardly and downwardly, in the tubular support 32. The spring 41 resiliently opposes downward movement of the front end of the engine and post 34 and as the latter is guided by the tubular support 32 so as to move substantially in a vertical course, the spring is prevented from influencing the oscillatory movement of the engine about the lengthwise extending axis 28.

During operation of substantially all engines there are numerous parts which move relative to the crankcase of the engine and a structure rigidly connected with the crankcase, many of which travel in different directions. The reactions upon the crankcase from the simultaneous movements of such parts in diverse directions create resultant forces which tend to cause the engine to move through a maximum amplitude in a somewhat regular path. In the case of a four-cylinder-in-line engine, the secondary force impulses constitute the predominating unbalanced internal forces and they are applied in the direction of reciprocation of the pistons and their frequency varies in accordance with the speed of operation of the engine. In the engine illustrated in the drawings, these secondary force impulses are exerted in vertical directions and they tend to oscillate the engine about the crosswise extending axis 29.

An engine of the above character is also subjected to torque reaction impulses which tend to oscillate it about the axis 28 extending in the general direction of the length of the engine unit. The frequency of the torque reaction impulses also varies in accordance with the speed of operation of the engine.

The rubber pad 40 is deflected during movement of the engine under the influence of the torque reaction impulses and it therefore resiliently opposes such movement. The superimposed pad 40 and spring 41 cooperate together in resiliently opposing movement of the engine in the direction of its movement of maximum amplitude under the influence of the unbalanced internal forces. The pad may be calibrated to bring the resistance to the movement of the engine under the influence of the torque reaction impulses to a desired value so as to predetermine the maximum reaction which will be applied on the frame by the torque reaction impulses. Then by providing a spring 41, having a proper resistance to deflection, to coact with the pad in opposing movement of the engine in the other direction, the resistance to movement of the engine in the latter direction can be predetermined independently with respect to the resistance to movement of the engine under the torque reaction impulses so as to predetermine the maximum reaction on the frame by the unbalanced internal forces.

The creation of vibration periods by the torque reaction impulses during operation of the engine can be effectively guarded against by preventing the frequency of the torque reaction impulses from occurring in synchronous or phased relation with the natural frequency of oscillation about the axis with respect to which the engine is oscillated by these impulses. This precaution does not prevent the creation of vibration periods by the secondary force impulses. Such vibration periods can be effectively guarded against by preventing the frequency of the secondary force impulses from occurring in synchronous or phased relation with the natural frequency of oscillation of the engine about the axis with respect to which the secondary forces tend to oscillate it.

The natural frequency of the engine upon its mountings is influenced by the character of the rubber in the mounting members. As these rubber elements are called upon to accomplish definite functions, such as supporting of the weight of the engine and limiting its movement within a predetermined desired range, respectively, they cannot always be provided with those properties which are required to bring the natural frequency of oscillation below the frequency of the torque reaction impulses at the lower end of the driving range of the engine. When this condition exists the natural frequency of oscillation of the engine is predetermined by allowing a resilient member to coact between the engine and the chassis frame.

In the illustration shown, the natural frequency of oscillation of the engine about the axis 28 is controlled by a leaf spring 43, as best shown in Fig. 3, which is fixed to the lower side of the clutch housing 14 by means of a bracket 44. The outer end of the leaf spring 43 is received in a slot 45 in a rubber block 46 secured to the chassis frame by a bracket 47 to which the rubber is preferably bonded by vulcanization. The leaf spring 43 resiliently opposes oscillation of the engine about the axis 28 and it is calibrated to bring the natural frequency of oscillation of the engine about this particular axis below the frequency of the torque reaction impulses at the lower end of the operating range of the engine.

In order to prevent the creation of severe vibration periods by the occurrence, within the driving range of the engine, of synchronous and phased relations of the secondary force impulses and the natural frequency of oscillation of the engine about the axis 29, the spring 41 is calibrated to bring the natural frequency of oscillation of the engine about this particular axis below the frequency of the secondary force impulses at the lower end of the operating range of the engine. In this manner, the creation of severe vibration periods during idling and running operation of the engine is actually prevented.

The coil spring 41 does not influence the natural frequency of oscillation of the engine about the lengthwise extending axis 28 and the leaf spring 43 has substantially no effect upon the natural frequency of oscillation of the engine about the axis 29. For this reason, these resilient members may be independently calibrated so as to properly control the natural frequency of oscillation of the engine about the respective axes.

In the illustration shown in Figs. 1 to 5, inclusive, the front mounting member 31 is located at a higher elevation than the rear mounting member so as to cause the axis 28 to extend substantially through the center of mass of the engine. Though this arrangement of the mounting members is desirable it is also true that material advantages are gained by the employment of my improved mounting in installations in which the lengthwise extending axis of oscillation is spaced from the center of mass of the engine.

Regardless of the directions in which the secondary or other internal force impulses in diverse engines are applied, the mounting member 31 can be disposed so as to position the spring 41 thereof so that it will predetermine the resistance to movement or the natural frequency of oscillation of the engine about the axis with respect to which such forces tend to oscillate it without influencing the resistance to movement or the natural frequency of oscillation of the engine about the axis with respect to which the torque impulses tend to oscillate it.

In the form shown in Figs. 6 and 7, my improved engine mounting member includes an inner channel-shaped bracket 48 and an outer channel-shaped bracket 49 between the adjacent faces of which is disposed a rubber block 50. The rubber member 50 is preferably integrally bonded by vulcanization to the adjacent faces of the channel members 48 and 49. The sides of the outer channel shaped bracket 49 extend beyond the rubber element 50 and they are provided with apertures for receiving bolts 51 by which the mounting is rigidly fixed to an upstanding intermediate portion 52 of a transverse frame member similar to the frame member 11 shown in Fig. 1. The upstanding portion 52 has an upwardly extending channel-shaped section 53 for receiving the outer channel-shaped bracket 49 which is also provided with apertures for receiving the bolts 51.

Formed at the upper end of the inner channel-shaped bracket 48 is a substantially semi-cylindrical flange 54 which is substantially concentric with a spaced arcuate-shaped plate 55. The plate 55 is attached to the flange 54 by a rubber pad 56 which is preferably bonded by vulcanization to the adjacent faces of the flange and plate. The plate 55 is provided with apertures for receiving bolts 57 by which it is attached to a flange 58 that is rigidly fixed on the front end of the engine or at any other suitable location.

When the mounting member shown in Figs. 6 and 7 is employed in an engine mounting assembly of the type shown in Fig. 1, the rubber element 50 resiliently supports the weight of the front end of the engine and serves as a spring in resiliently resisting movement of the engine and in controlling the frequency of oscillation of the engine about the axis with respect to which the secondary force impulses tend to oscillate it without influencing the natural frequency of oscillation of the engine about the axis with respect to which the torque reaction impulses tend to oscillate it. The rubber pad 56 permits oscillation of the engine about the latter axis in response to the torque reaction impulses and it serves as insulation for preventing the transmission of sound vibrations from the metal structure of the engine to the metal frame structure. The rubber element 50 may be calibrated to bring the resistance to movement of the engine about the axis 29 to a desired value or to bring the natural frequency of oscillation of the engine about this axis below the frequency of the secondary force impulses at the lower end of the operating range of the engine.

In Fig. 8 is illustrated an engine mounting of a different form which is also adapted to be used at the front end of an engine assembly of the character shown in Fig. 1. This mounting member includes a stationary tubular support 59, substantially identical to the tubular support 32 shown in Fig. 5, which is similarly mounted on the upstanding intermediate portion 60 of a transverse frame member like that shown at 11 in Fig. 1. Slidably mounted in the tubular support 59 is a hollow cylindrical post 61 which is provided on its upper external end with a rubber pad 62. Mounted on the pad 62 is a bearing element 63 in which is journaled a trunnion 64 rigidly fixed on the front end of the engine. The rubber pad 62 is preferably bonded by vulcanization to the adjacent sides of the bearing element 63 and shiftable post 61.

The trunnion 64 pivotally supports the front end of the engine in a manner which permits oscillation thereof about an axis extending lengthwise of the engine unit in response to the torque reaction impulses. The bearing element 63 is resiliently supported vertically by a metal coil spring 65 which is confined within the tubular support 59 and the hollow cylindrical post 61 and which bears between opposite ends of these members. The spring 65 resiliently opposes downward movement of the front end of the engine during oscillation thereof about an axis extending crosswise of the length of the engine unit and it has no influence upon the frequency of oscillation of the engine about the lengthwise extending axis. The spring 65 may be calibrated to bring the resistance to movement of the engine about the crosswise extending axis to a predetermined value, or to bring the natural frequency of oscillation of the engine about this axis below the frequency of the torque reaction impulses at the lower end of the driving range of the engine.

The engine mounting member shown in Fig. 9 is also adapted to be used in an engine mounting assembly of the character shown in Fig. 1. In this form the mounting member includes a supporting arm 66 which is either formed integral or rigidly fixed to an upstanding intermediate portion of a transverse frame member 67. Pivotally mounted at 68 on the arm 66 is a bracket 69 which extends over the central medial portion of the transverse frame member and which registers with a protruding flange 70 carried by the engine. A rubber block 71 having plates 72 and 73, preferably bonded by vulcanization to its upper and lower sides respectively, is interposed between the upper side of the bracket 69 and the lower side of the flange 70. The plates 72 and 73 are rigidly fixed by bolts 74 and 75 to the engine flange 70 and to the bracket 69, respectively. The block 71 permits oscillation of the engine unit about an axis extending in the general direction of the length thereof and it also serves as an insulator for preventing the transmission of sound vibrations from the engine to the frame structure.

Interposed between the lower side of the pivotally mounted bracket 69 and the central portion of the upstanding intermediate part 67 of the transverse frame member is a coil spring 76 which resiliently supports the weight of the front end portion of the engine or that portion thereof at which the mounting member is located. This spring is held against displacement by lugs 77 and 78 formed on the bracket 69 and intermediate portion 67 of the transverse frame member respectively. The bracket 69 moves upon an arc described about its pivotal axis 68. Such movement, however, is substantially limited and as a result the bracket deviates but slightly from a substantially linear vertical course. The pivotal connection between the bracket and the supporting arm 66 therefore guides the movement of the bracket in such a manner as to prevent the spring 76 from influencing the resistance to displacement of the engine, or the natural frequency of oscillation of the engine with respect to the lengthwise extending axis while permitting it to resiliently oppose and control the natural frequency of oscillation about an axis extending crosswise of the length of the engine unit. The spring 76 may be calibrated to bring the natural frequency of oscillation of the engine unit about the axis with respect to which it is oscillated by the secondary force impulses below the frequency of such impulses at the lower end of the operating range of the engine.

With all the above forms of mounting members, the natural frequency of oscillation or the resistance to oscillation of the engine unit about the axis with respect to which the torque reaction and the secondary force impulses tend to oscillate it, may be independently predetermined so as to either predetermine the maximum reaction applied on the frame by such forces or to avoid the occurrence of either of these forces in synchronous or phased relation with the natural frequency of oscillation of the engine during the operating range thereof. In this manner, creation of severe shock and vibration periods during both idling and driving operation of the engine is effectively guarded against.

Although but several embodiments of my invention are herein disclosed and described, it will be understood that various changes in the size, shape and arrangement of parts may be made without departing from the spirit of my invention, and it is not my intention to limit its scope other than by the terms of the appended claims.

I claim:

1. In combination, a frame structure, an internal combustion engine having inherent force impulses during operation tending to move it in diverse directions, mounting members on said frame structure yieldably supporting said engine for oscillatory movement in said directions about diverse axes, at least one of said members having a pair of superimposed weight supporting resilient elements each deflectively coacting together in resiliency opposing oscillatory movement of said engine in one direction about one of said axes, and means holding one of said resilient elements against influencing the oscillatory movement of said engine in all other directions.

2. In combination, a frame structure, an internal combustion engine having torque reaction and unbalanced internal force impulses during operation, each tending to move it in a different direction, and means for oscillatively supporting said engine on said frame structure including a mounting member on said frame yieldably supporting said engine having a pair of resilient elements for opposing movement of said engine in response to said internal force impulses, only one of said resilient elements being adapted to oppose movement of said engine in response to said torque reaction impulses.

3. In combination, an internal combustion engine of the reciprocating piston type having inherent torque reaction and secondary force impulses during operation, each tending to oscillate it about a different axis respectively, means supporting said engine for oscillatory movement about each axis respectively, including resilient weight supporting elements so constructed and arranged as to bring the natural frequency of oscillation of said engine about each axis to different predetermined values respectively.

4. In combination, an internal combustion engine of the reciprocating piston type having inherent torque reaction and secondary force impulses during operation, each tending to oscillate it about a different axis respectively, resilient means supporting said engine for oscillatory movement about each axis respectively including resilient weight supporting elements so constructed, and arranged and calibrated as to bring the natural frequency of oscillation of said engine about the axis with respect to which said torque reaction impulses tend to oscillate it to a predetermined value below the frequency of said torque reaction impulses at the lower end of the operating range of said engine and to bring the natural frequency of oscillation of said engine about the other axis to a predetermined value below the frequency of said secondary force impulses at the lower end of the operating range of said engine.

5. A mounting for an internal combustion engine including a frame structure, and spaced mounting members on said frame structure constructed and arranged to support said engine for oscillatory movement about a pair of axes, at least one of said mounting members having a pair of resilient elements coacting together in supporting a portion of the weight of said engine and resiliently opposing oscillation of said engine about one of said axes and only one of said resilient elements being adapted to resiliently oppose oscillation of said engine about the other axis.

6. A mounting for an internal combustion engine including a frame structure, mounting members interposed between said engine and said frame structure including relatively movable connected elements, one secured to said engine and the other secured to said frame structure and constructed and arranged to support said engine for oscillatory movement about a longitudinally extending axis in response to the torque reaction impulses of said engine and about a transversely extending axis in response to the secondary force impulses thereof, resilient means coacting between said frame structure and engine for controlling the natural frequency of oscillation of said engine about said first axis, and a resilient weight supporting member coacting between the relatively movable elements of at least one of said mounting members for controlling the natural frequency of oscillation of said engine about said second axis independently of said resilient means, said resilient members being so constructed and arranged as to guard against its influencing the natural frequency of oscillation of said engine about said first mentioned axis.

7. A mounting for an internal combustion engine including a frame structure, a mounting member interposed between said engine and said frame structure and constructed and arranged to support said engine for oscillatory movements about a pair of axes, a second mounting member spaced from said first mounting member having a part fixed to said frame structure and having a relatively shiftable part, a member fixed on said engine and pivotally connected with the shiftable part of said second mounting member, means for guiding said shiftable part adapted to prevent movement thereof by the oscillatory movement of said engine about one of said axes, resilient means coacting between said frame structure and said engine for predetermining the natural frequency of oscillation of said engine about the latter axis, and resilient means coacting between the fixed and shiftable parts of said second mounting member for predetermining the natural frequency of oscillation of said engine about the other axis independently of said resilient means.

8. A mounting for an internal combustion engine including a frame structure, a mounting member interposed between said engine and said frame structure and constructed and arranged to support said engine for oscillatory movements about a pair of axes, a second mounting member spaced from said first mounting member having a part fixed to said frame structure and having a relatively shiftable part, means including a yieldable non-metallic pad interposed between said shiftable part and engine pivotally supporting the latter, means for guiding said shiftable part adapted to prevent movement thereof by the oscillation of said engine about one of said axes, resilient means coacting between said frame structure and said engine for predetermining the natural frequency of oscillation of said engine about the latter axis, and resilient means coacting between the fixed and shiftable parts of said second mounting member for predetermining the natural frequency of oscillation of said engine about the other axis independently of said resilient means.

9. A mounting for an internal combustion engine including a frame structure, a mounting member interposed between said engine and said frame structure and constructed and arranged to support said engine for oscillatory movements about a pair of axes, a second mounting member spaced from said first mounting member having a part fixed to said frame structure and having a relatively shiftable part, a member on said shiftable part pivotally supporting said engine for oscillation about one of said axes, a rubber connecting element between the fixed and shiftable parts of said second mounting member resiliently supporting said engine for predetermining the natural frequency of oscillation of said engine about the other axis, and resilient means coacting between said frame and engine for predetermining the natural frequency of oscillation of said engine about the first mentioned axis independently of said rubber connecting element, so as to enable the natural frequencies of oscillation of said engine about each axis to be individually predetermined.

10. A mounting for an internal combustion engine including a frame structure, a mounting member interposed between said engine and said frame structure and constructed and arranged to support said engine for oscillatory movements about a pair of axes, a second mounting member spaced from said first mounting member having a part fixed to said frame structure and having a relatively shiftable part, a trunnion on said engine, a bearing element on the shiftable part of said second mounting for receiving said trunnion and pivotally supporting said engine for oscillatory movement about one of said axes, a spring interposed between the fixed and shiftable parts of said second mounting resiliently supporting said engine and adapted to predetermine the natural frequency of oscillation of said engine about the other axis, and resilient means coacting between said frame and engine for predetermining the natural frequency of oscillation of said engine about the first mentioned axis independently of said connecting element so as to enable the natural frequencies of oscillation of said engine about each axis to be individually predetermined.

11. A mounting for an internal combustion engine including a frame structure, mounting members interposed between said engine and said frame structure, one of said mounting members including a stationary element and a relatively movable element secured to said frame structure and engine respectively and constructed and arranged to support said engine for oscillatory movements about a pair of axes, resilient means coacting between and secured to said movable element and engine respectively for predetermining the natural frequency of oscillation of said engine about one of said axes, and a resilient member coacting between said stationary and movable elements for predetermining the natural frequency of oscillation of said engine about the other axis.

12. A mounting for an internal combustion engine including a frame structure, a mounting member interposed between said engine and said frame structure and constructed and arranged to support said engine for oscillatory movements about a pair of axes, a second mounting member spaced from said first mounting member having a part fixed to said frame structure and having a relatively shiftable part, means including a resilient element interposed between said shiftable part and engine for pivotally supporting the latter and predetermining its natural frequency of oscillation about one of said axes, and resilient means coacting between the fixed and shiftable parts of said second mounting member for predetermining the natural frequency of oscillation of said engine about the other axis.

13. A mounting for an internal combustion engine including a frame structure, a mounting member interposed between said engine and said frame structure and constructed and arranged to support said engine for oscillatory movements about a pair of axes, a second mounting member spaced from said first mounting member having a part fixed to said frame structure and having a relatively shiftable part, means including a resilient element interposed between said shiftable part and engine for pivotally supporting the latter and predetermining its natural frequency of oscillation about one of said axes, means for guiding said shiftable part adapted to prevent movement thereof by the oscillation of said engine about the latter axis, and resilient means coacting between the fixed and shiftable parts of said second mounting member for predetermining the natural frequency of oscillation of said engine about the other axis.

14. A mounting member for supporting an internal combustion engine including a stationary rigid part securable to a frame structure, an intermediate rigid element movable relative to said stationary part, means for confining the movement of said intermediate element to a predetermined locus, a rigid part securable to said engine, a yieldable non-metallic pad disposed between said latter rigid part and said intermediate element, and a resilient element interposed between said intermediate element and said stationary rigid element.

15. A mounting member for supporting an internal combustion engine including a stationary rigid part securable to a frame structure, an intermediate rigid element movable relative to said stationary part, means for confining the movement of said intermediate element to a predetermined locus, a rigid part securable to said engine, a layer of rubber disposed between and rigidly secured to said latter rigid part and said intermediate element respectively, and a resilient element interposed between said intermediate element and said stationary rigid element.

16. The combination of an internal combustion engine unit having a crankshaft, a frame structure, and yieldable mounting members coacting between said frame structure and said engine unit to mount the latter and being so constructed and arranged as to provide for oscillation thereof about an axis extending lengthwise of said unit and substantially through the center of mass thereof and about another axis extending transversely of said unit, at least one of said mounting members having a pair of resilient elements for supporting a portion of the weight of said unit and predetermining the natural frequency of oscillation of said unit about one of said axes, only one of said resilient elements being adapted to influence the natural frequency of oscillation of said unit about the other axis.

17. The combination of an internal combustion engine unit having a crankshaft, a frame structure, and yieldable mounting members coacting between said frame structure and said engine unit to mount the latter and being so constructed and arranged as to provide for oscillation thereof about an axis extending lengthwise of said unit and substantially through the center of mass thereof and about another axis extending transversely of said unit, at least one of said mounting members having a pair of resilient elements for supporting a portion of the weight of said unit and predetermining the natural frequency of oscillation of said unit about said latter axis, only one of said resilient elements being adapted to influence the natural frequency of oscillation of said unit about the other axis.

18. The combination of an internal combustion engine unit having a crankshaft, a frame structure, and yieldable mounting members coacting between said frame structure and said engine unit to mount the latter and being so constructed and arranged as to provide for oscillation thereof about an axis extending lengthwise of said unit and substantially through the center of mass thereof and about another axis extending transversely of said unit, at least one of said mounting members having a pair of resilient elements for supporting a portion of the weight of said unit and predetermining the natural frequency of oscillation of said unit about the latter axis and including means for holding one of said resilient elements from influencing the natural frequency of oscillations of said unit about the other axis.

19. The combination of an internal combustion engine unit having a crankshaft, a frame structure, and yieldable mounting members coacting between said frame structure and said engine unit to mount the latter and being so constructed and arranged as to provide for oscillation thereof about an axis extending in the direction of the length of said unit and about another axis extending transversely of the length of said unit, at least one of said mounting members having a pair of resilient elements sustaining a portion of the weight of said unit and coacting together in resiliently opposing oscillation of said unit about the latter axis and including means for holding one of said resilient elements against influencing the oscillatory movement of said unit about the other axis.

20. The combination of an internal combustion engine unit having a crankshaft, a frame structure, and yieldable mounting members coacting between said frame structure and said engine unit to mount the latter and being so constructed and arranged as to provide for oscillation thereof about an axis extending in the direction of the length of said unit and about another axis extending transversely of the length of said unit, at least one of said mounting members having a pair of resilient elements sustaining a portion of the weight of said unit and coacting together in resiliently opposing oscillation of said unit about one of said axes, only one of said resilient elements being adapted to resiliently oppose oscillatory movement of said unit about the other axis.

21. The combination of an internal combustion engine unit having a crankshaft, a frame structure, and yieldable mounting members coacting between said frame structure and said engine unit to mount the latter and being so constructed and arranged as to provide for oscillation thereof about an axis extending in the direction of the length of said unit and about another axis extending transversely of the length of said unit, at least one of said mounting members having resilient means comprising a superimposed spring and resilient non-metallic pad so constructed and arranged as to coact together in resiliently opposing oscillation of said unit about one of said axes and including means for holding said spring against influencing oscillatory movement of said unit about the other axis.

22. In combination, an internal combustion engine unit having inherent force impulses during operation tending to oscillate it about a plurality of axes, and means yieldably supporting said engine for oscillatory movement about each of said axes respectively, including a mounting member having a pair of resilient elements sustaining a portion of the weight of said engine and co-acting together in predetermining the natural frequency of oscillation of said engine unit about one of said axes, and only one of said resilient elements being constructed and arranged to regulate the natural frequency of oscillation of said engine unit about the other axis.

23. In combination, an internal combustion engine unit having inherent force impulses during operation tending to oscillate it about a plurality of axes, and means yieldably supporting said engine for oscillatory movement about each of said axes respectively, including a mounting member having a pair of resilient elements sustaining a portion of the weight of said engine and co-acting together in predetermining the natural frequency of oscillation of said engine unit about one of said axes, and including means for holding one of said resilient elements against influencing the natural frequency of oscillation of said engine unit about the other axis, the other resilient element being adapted to predetermine the latter frequency of oscillation.

ROGER K. LEE.

CERTIFICATE OF CORRECTION.

Patent No. 1,957,218.   May 1, 1934.

ROGER K. LEE.

It is hereby certified that error appears in the printed specification of the above numbered patent requiring correction as follows: Page 4, line 131, claim 1, for "resiliency" read resiliently; and that the said Letters Patent should be read with this correction therein that the same may conform to the record of the case in the Patent Office.

Signed and sealed this 26th day of February, A. D. 1935.

(Seal)

Leslie Frazer
Acting Commissioner of Patents.

unit, at least one of said mounting members having a pair of resilient elements sustaining a portion of the weight of said unit and coacting together in resiliently opposing oscillation of said unit about the latter axis and including means for holding one of said resilient elements against influencing the oscillatory movement of said unit about the other axis.

20. The combination of an internal combustion engine unit having a crankshaft, a frame structure, and yieldable mounting members coacting between said frame structure and said engine unit to mount the latter and being so constructed and arranged as to provide for oscillation thereof about an axis extending in the direction of the length of said unit and about another axis extending transversely of the length of said unit, at least one of said mounting members having a pair of resilient elements sustaining a portion of the weight of said unit and coacting together in resiliently opposing oscillation of said unit about one of said axes, only one of said resilient elements being adapted to resiliently oppose oscillatory movement of said unit about the other axis.

21. The combination of an internal combustion engine unit having a crankshaft, a frame structure, and yieldable mounting members coacting between said frame structure and said engine unit to mount the latter and being so constructed and arranged as to provide for oscillation thereof about an axis extending in the direction of the length of said unit and about another axis extending transversely of the length of said unit, at least one of said mounting members having resilient means comprising a superimposed spring and resilient non-metallic pad so constructed and arranged as to coact together in resiliently opposing oscillation of said unit about one of said axes and including means for holding said spring against influencing oscillatory movement of said unit about the other axis.

22. In combination, an internal combustion engine unit having inherent force impulses during operation tending to oscillate it about a plurality of axes, and means yieldably supporting said engine for oscillatory movement about each of said axes respectively, including a mounting member having a pair of resilient elements sustaining a portion of the weight of said engine and co-acting together in predetermining the natural frequency of oscillation of said engine unit about one of said axes, and only one of said resilient elements being constructed and arranged to regulate the natural frequency of oscillation of said engine unit about the other axis.

23. In combination, an internal combustion engine unit having inherent force impulses during operation tending to oscillate it about a plurality of axes, and means yieldably supporting said engine for oscillatory movement about each of said axes respectively, including a mounting member having a pair of resilient elements sustaining a portion of the weight of said engine and co-acting together in predetermining the natural frequency of oscillation of said engine unit about one of said axes, and including means for holding one of said resilient elements against influencing the natural frequency of oscillation of said engine unit about the other axis, the other resilient element being adapted to predetermine the latter frequency of oscillation.

ROGER K. LEE.

CERTIFICATE OF CORRECTION.

Patent No. 1,957,218.     May 1, 1934.

ROGER K. LEE.

It is hereby certified that error appears in the printed specification of the above numbered patent requiring correction as follows: Page 4, line 131, claim 1, for "resiliency" read resiliently; and that the said Letters Patent should be read with this correction therein that the same may conform to the record of the case in the Patent Office.

Signed and sealed this 26th day of February, A. D. 1935.

(Seal)

Leslie Frazer
Acting Commissioner of Patents.